United States Patent [19]

Brill

[11] Patent Number: 4,987,703
[45] Date of Patent: Jan. 29, 1991

[54] METHOD OF AND APPARATUS FOR CHANGING MATERIAL REMOVING WHEELS IN MACHINE TOOLS

[75] Inventor: Jürgen Brill, Stuttgart, Fed. Rep. of Germany

[73] Assignee: Schaudt Maschinenbau GmbH, Stuttgart, Fed. Rep. of Germany

[21] Appl. No.: 223,427

[22] Filed: Jul. 22, 1988

[30] Foreign Application Priority Data

Jul. 25, 1987 [DE] Fed. Rep. of Germany ....... 3724697

[51] Int. Cl.$^5$ .............................................. B24B 41/00
[52] U.S. Cl. ............................ 51/166 R; 51/166 MH; 51/281 R
[58] Field of Search ....... 51/166 R, 166 MH, 166 TS, 51/168, 165 R, 165.71, 281 R

[56] References Cited

U.S. PATENT DOCUMENTS

| | | | |
|---|---|---|---|
| 2,168,596 | 8/1939 | Hall | 51/166 R |
| 2,804,727 | 9/1957 | Schmidt | 51/166 R |
| 3,925,878 | 12/1975 | Kikuchi | 51/166 MH |
| 4,584,759 | 4/1986 | Bleich | 51/166 R |
| 4,628,587 | 12/1986 | Kawaguchi et al. | 51/168 |
| 4,683,679 | 8/1987 | Salmon | 51/168 |

Primary Examiner—J. J. Hartman
Attorney, Agent, or Firm—Peter K. Kontler

[57] ABSTRACT

A grinding wheel which is mounted on the tool spindle of a grinding machine is detached from the tool spindle and is transferred onto a second spindle while the two spindles rotate. Reattachment of the grinding wheel to the tool spindle also takes place while the two spindles rotate. This saves time and reduces the wear upon the bearings and upon the brakes for the tool spindle. If a grinding wheel on the tool spindle is to be replaced with a different or fresh grinding wheel, the machine uses two additional spindles one of which serves to accept a grinding wheel from the tool spindle and the other of which delivers a different or fresh grinding wheel to the tool spindle.

4 Claims, 2 Drawing Sheets

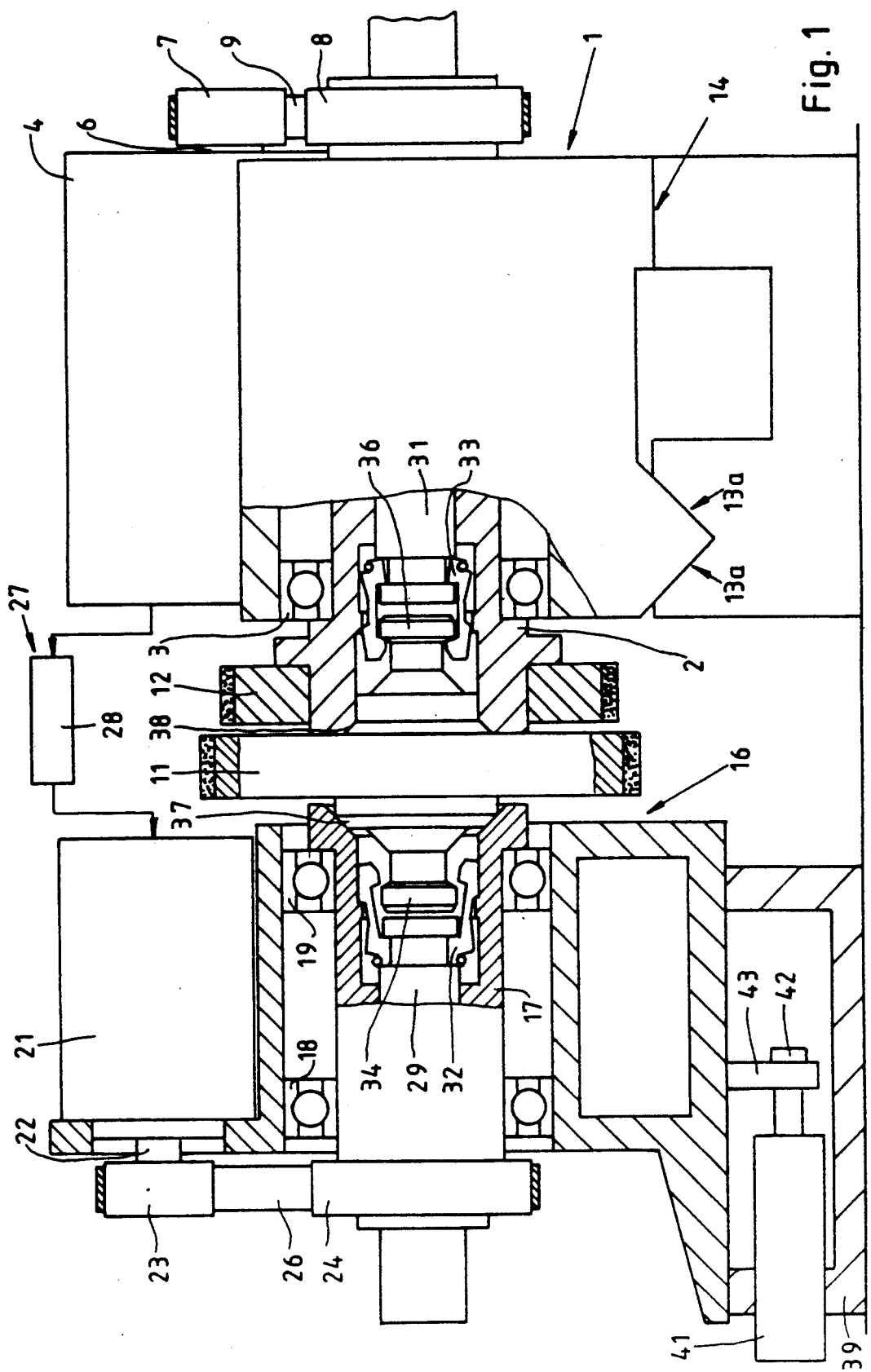

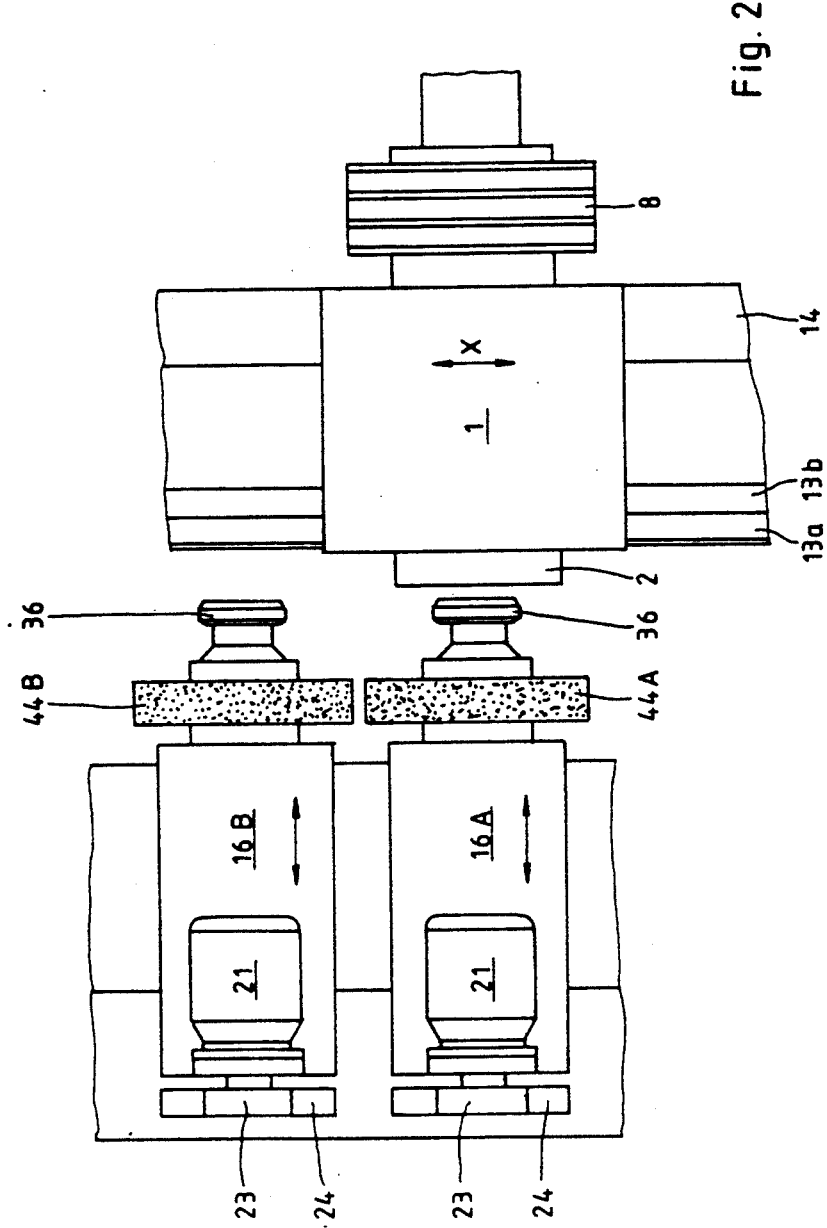

METHOD OF AND APPARATUS FOR CHANGING MATERIAL REMOVING WHEELS IN MACHINE TOOLS

CROSS-REFERENCE TO RELATED CASE

The grinding machine of the present invention can employ wheelheads of the type disclosed in commonly owned copending patent application Serial No. 223,780 filed July 22, 1988 for "Wheelhead" for grinding machines.

The invention relates to improvements in machine tools of the type wherein workpieces are treated by rotary material removing tools, especially to improvements in grinding machines. More particularly, the invention relates to improvements in apparatus for changing rotary material removing tools in such machines. The invention also relates to a method of changing grinding wheels and other types of rotary material removing tools in grinding, polishing and like machines.

It is well known to equip a machine tool, such as a grinding machine, with apparatus which can deliver fresh grinding wheels or other rotary material removing tools to the tool spindle and which can accept spent rotary tools (or tools which are to be replaced with different tools) from the tool spindle. All such apparatus can only apply a rotary tool to or accept a rotary tool from the tool spindle while the latter is idle. This holds true irrespective of the nature of the tool changing apparatus, i.e., regardless of whether the apparatus is to be manipulated by hand or is automated, either in part or entirely. This creates problems in machine tools wherein the material removing tools must be removed from the tool spindle and reattached to the tool spindle at frequent intervals, e.g., upon completed treatment or upon completed partial treatment of each of a short or long series of successive workpieces. Thus, it is necessary to repeatedly brake the tool spindle and to repeatedly accelerate the tool spindle, once during each change of tools. Such frequent braking and acceleration cause extensive wear upon the bearings for the tool spindle and other rotary parts as well as upon the components of the drive means for the tool spindle, e.g., upon conveyor belts and other accessories of the means for transmitting torque from a prime mover to the tool spindle. Still further, repeated braking and acceleration contribute significantly to the energy requirements of the machine tool and they prolong the intervals of treatment of workpieces because each such interval includes a period of time which is required for complete deceleration and acceleration of the tool spindle.

OBJECTS OF THE INVENTION

An object of the invention is to provide a novel and improved method of changing material removing tools (particularly grinding wheels) in a machine tool in such a way that the changing operation is completed within a fraction of the time which is required in accordance with heretofore known methods.

Another object of the invention is to provide a method of repeatedly changing one and the same tool or of exchanging different tools in a time-saving operation and with consumption of relatively small amounts of energy.

A further object of the invention is to provide a method which can be carried out in such a way that the moving parts of the machine tool are subject to less pronounced wear than in accordance with conventional methods.

An additional object of the invention is to provide a machine tool, particularly a grinding or like machine, with novel and improved apparatus for rapidly changing material removing tools in such a way that the wear upon the tool spindle or spindles, their bearings and their drives is much less pronounced than in heretofore known machine tools.

Still another object of the invention is to provide the machine tool with novel and improved means for accepting rotary material removing tools from and for delivering rotary material removing tools to the tool spindle or spindles.

A further object of the invention is to provide the machine tool with novel and improved means for changing material removing tools with the consumption of relatively small amounts of energy.

Another object of the invention is to provide the machine tool with novel and improved means for maintaining one or more material removing tools in positions of readiness for attachment to the tool spindle.

SUMMARY OF THE INVENTION

One feature of the present invention resides in the provision of a method of manipulating a material removing tool (hereinafter called wheel) which is mounted on the rotary spindle of a grinding or like machine during removal of material from workpieces. The method comprises the steps of rotating the spindle, and transferring the wheel between the spindle and a wheel carrier while the spindle rotates. The carrier can comprise or constitute a second spindle, and the method can further comprise the step of rotating the carrier in the course of the transferring step. The step of rotating the carrier can include driving the carrier at a speed which equals or at least approximates the speed of the spindle.

The method can further comprise the step of maintaining the carrier in rotary motion as long as the wheel is supported by the carrier. Alternatively, the carrier is set in rotary motion at least shortly prior to transfer of a wheel from the rotating carrier onto the rotating spindle of the grinding machine.

The carrier is maintained in axial alignment with the spindle of the grinding machine in the course of the transferring step regardless of whether the wheel is transferred from the spindle of the grinding machine onto the carrier or vice versa.

Another feature of the invention resides in the provision of a machine tool (particularly a grinding machine) wherein workpieces are treated with rotary material removing tools (hereinafter wheels). The machine comprises a rotary tool spindle having means for releasably supporting a wheel thereon and for transmitting torque to the wheel, drive means for rotating the tool spindle, a tool carrier, and means for transferring a wheel between the tool spindle and the carrier while the drive means rotates the tool spindle. The carrier preferably includes a second rotary spindle, and the transferring means includes means for transferring a wheel between the two spindles.

The transferring means can comprise a first disengageable clamping unit having means for coupling a wheel to the tool spindle, a second disengageable clamping unit having means for coupling a wheel to the second spindle, and means for disengaging the clamping units. At least one of the spindles is preferably hollow so that the respective clamping unit can be installed in the hollow spindle.

The wheels which are manipulated in accordance with the invention can be of the type having a hub with a first side and a second side and coaxial anchoring portions at such sides of the hub. Each of the coupling means can include means for releasably engaging an anchoring portion of the wheel which is to be transferred between the spindles.

The carrier further comprises motor means for rotating the second spindle. If one and the same wheel is to be repeatedly transferred between the two spindles, the spindles are coaxial preparatory to and during transfer of a wheel and the carrier is movable in the axial direction of the spindles. Means (e.g., a fluid-operated motor) can be provided for moving the carrier in the axial direction of the spindles between a first position in which the second spindle is adjacent the tool spindle and a second position in which the second spindle is remote from the tool spindle.

The machine preferably further comprises means for synchronizing the operation of the motor means for the second spindle with the operation of drive means for the tool spindle. The synchronizing means can comprise means for regulating the RPM of the motor means as a function of the RPM of the tool spindle.

The machine can comprise at least one additional carrier. The transferring means then comprises means for transferring a wheel between the tool spindle and either of the carriers. Such machine can be used with advantage if a wheel on the tool spindle is to be replaced with a different wheel. One of the carriers then accepts the previously used wheel and the other carrier supplies a fresh wheel. The plural carriers are or can be at least substantially identical and they can be disposed adjacent each other so that the axes of their (second) spindles are parallel to the axis of the tool spindle.

The novel features which are considered as characteristic of the invention are set forth in particular in the appended claims. The improved machine tool itself, however, both as to its constructon and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly elevational and partly sectional view of a grinding machine which is provided with tool changing apparatus embodying one form of the invention and serving to repeatedly transfer a tool from and to a rotary tool spindle; and FIG. 2 is a fragmentary plan view of a modifed machine wherein the tool changing apparatus is designed to replace the material removing tool on the tool spindle with a different tool.

DESCRIPTION OF PREFERRED EMBODIMENTS

Referring first to FIG. 1, there is shown a portion of a grinding machine, e.g., an external cylindrical grinding machine, which comprises a wheelhead 1 including a rotary tool spindle 2 mounted in antifriction bearing means 3 and receiving torque from a drive means including a variable-speed electric motor 4 and a transmission having a pulley 7 on the output shaft 6 of the motor 4, a pulley 8 on the spindle 2, and an endless belt 9 which is trained over the pulleys 7 and 8. The front end portion of the spindle 2 carries and transmits torque to a more or less permanently installed first grinding wheel 12 and a detachable second grinding wheel 11 which must be transferred at certain times from the spindle 2 onto the spindle 17 of a reciprocable tool carrier 16 and vice versa. As described in the aforementioned commonly owned copending patent application Serial No. 223,780 the grinding wheel 11 can be designed to carry out a coarse preliminary grinding operation upon a selected workpiece (e.g., the cams of a camshaft as shown in FIG. 1 of the copending patent application Serial No. 223,780), and the wheel 12 can be used for finish, precision or final grinding of the workpiece. The arrangement is then such that the grinding wheel 12 remains attached to the spindle 2 until it requires replacement as a result of extensive wear or other damage, and the wheel 11 is detached after completion of the preliminary grinding operation upon a workpiece which is held between the centers of a suitable headstock and a suitable tailstock in a manner well known from the art of grinding machines and like machine tools. Reference may be had, for example, to commonly owned U.S. Pat. No. 4,625,461 granted Dec. 2, 1986 to Ulrich Vetter or to commonly owned U.S. Pat. No. 4,685,251 granted Aug. 11, 1987 to Rudolf Beyer et al.

The wheelhead 1 is reciprocable relative to the base or bed of the grinding machine along guide surfaces 13a, 13b and 14 at right angles to the plane of FIG. 1. The means for transferring the grinding wheel 11 from the spindle 2 of the wheelhead 1 onto the spindle 17 of the carrier 16 upon completion of each preliminary grinding operation and back from the spindle 17 onto the spindle 2 upon completion of each finish grinding operation by the grinding wheel 12 includes a first disengageable clamping unit 31 which is installed in the interior of the hollow spindle 2 and a second disengageable clamping unit 29 which is installed in the interior of the hollow spindle 17. The spindle 17 is rotatably journalled in antifriction bearings 18, 19 of the carrier 16, and the latter further includes a variable-speed motor 21 which can rotate the spindle 17 by way of a transmission including a pulley 23 on the output shaft 22 of the motor 21, a pulley 24 on the spindle 17, and an endless belt 26 which is trained over the pulleys 23 and 24.

An important feature of the improved apparatus which includes the carrier 16, its spindle 17, the motor 21, the transmission 22-24, 26 and the clamping units 29, 31 is that the grinding wheel 11 can be transferred between the spindles 2 and 17 while the spindle 2 rotates, i.e., it is not necessary to decelerate or arrest the spindle 2 preparatory to transfer of the grinding wheel 11 onto the spindle 17 or preparatory to transfer of the wheel 11 back onto the spindle 2. It is desirable and advantageous to ensure that the RPM of the spindle 17 in the bearings 18, 19 of the carrier 16 at least closely approximate or exactly match the RPM of the spindle 2 in the wheelhead 1 when the grinding wheel 11 is being transferred from the spindle 2 to the spindle 17 or vice versa. This is achieved by the provision of a synchronizing device 27 which includes a control unit 28 serving as a means for regulating the RPM of the spindle 17 as a function of the RPM of the spindle 2, i.e., as a function of RPM of the output shaft 6 of the prime mover 4 of the drive means 4, 6-9 for the spindle 2. The illustrated control unit 28 is connected between the control circuits of the prime mover 4 and motor 21.

The disengageable clamping unit 29 in the hollow spindle 17 of the carrier 16 is or can be identical with the disengageable clamping unit 31 in the hollow spindle 2. The clamping units 29 and 31 rotate with the respective spindles 17 and 2 so that they can constitute or can form part of the means for transmitting torque between the spindle 17 or 2 and the grinding wheel 11. The clamping unit 29 includes tongs 32 with jaws or claws which serve as a means for detachably coupling the spindle 17 with a suitably configured anchoring portion 34 extending from one side of the hub of the grinding wheel 11, and the clamping unit 31 includes tongs 33 with jaws or claws which serve as a means for releasably coupling the spindle 2 with a second anchoring portion 36 extending from the other side of the hub of the grinding wheel 11. The grinding machine of FIG. 1 further comprises preferably fluid-operated means for opening and closing the tongs 32 and 33 in response to signals from the operator or from an automatic programming unit, not shown. The spindle 2 has an internal conical surface 38 which can be engaged by a complementary conical external surface of the anchoring portion 36, and the spindle 17 has a conical internal surface which can be engaged by a complementary conical external surface 37 of the anchoring portion 34. The conical surface 38 centers the grinding wheel 11 when the latter is coupled to the spindle 2, and the conical surface 37 centers the grinding wheel 11 when the latter is coupled to the spindle 17. The fluid-operated means for opening and closing the tongs 32 and 33 can be designed to actually push the grinding wheel 11 from the spindle 2 toward the spindle 17 or in the opposite direction when the clamping units 29, 31 are disengaged and the grinding wheel 11 is to be moved axially, i.e., from the spindle 2 onto the spindle 17 or from the spindle 17 onto the spindle 2.

The clamping units 29, 31 are or can be of conventional design, the same as the fluid-operated opening and closing means for their tongs 32 and 33. For example, the clamping units 29, 31 and the opening and closing means therefor may be of the type known as Ott-Werkzeugspanner distributed by the Firm A. Ott Spanntechnik of German Federal Republic.

The carrier 16 can constitute a self-supporting entity which is reciprocable in the frame of the grinding machine between the illustrated first position in which the spindle 17 is closely adjacent the spindle 2 and the grinding wheel 11 can be transferred between the two spindles, and a second position in which the spindle 17 is more distant from the spindle 2 and the grinding wheel 11 on the spindle 17 is maintained in a position of readiness for transport back toward the spindle 2 (or in which the spindle 17, without the grinding wheel 11 thereon, is maintained in a position of readiness for advancement back toward the position of FIG. 1). The means for moving the carrier 16 between the two positions comprises a fluid-operated motor 41 which is installed in the understructure 39 of the machine frame and has a piston rod 42 attached to a motion receiving portion 43 of the carrier 16. The motor 41 can include a double-acting hydraulic cylinder and piston unit.

In order to transfer the grinding wheel 11 from the spindle 2 of the wheelhead 1 onto the spindle 17 of the carrier 16, the wheelhead 1 is moved along the guide surfaces 13a, 13b, 14 to a position in which the axis of the spindle 2 coincides with the axis of the spindle 17. The motor 41 is then caused to move the carrier 16 to the position of FIG. 1 in which the spindle 17 is closely adjacent the spindle 2. The movement of the carrier 16 toward the wheelhead 1 is terminated when the conical internal surface of the spindle 17 abuts the conical external surface 37 of the respective anchoring portion 34 of the grinding wheel 11. The clamping unit 31 is then disengaged, i.e., the claws or jaws of the tongs 33 release the anchoring portion 36, and the clamping unit 29 is engaged so that the jaws or claws of the tongs 32 engage the anchoring portion 34. In the next step, the motor 41 is actuated to move the carrier 16 away from the wheelhead 1 and its spindle 2 so that the grinding wheel 12 can be put to use to complete the grinding of the workpiece which was already treated by the detached grinding wheel 11.

It is presently preferred to construct the torque transmitting connection between the motor 1 and the spindle 17 in such a way that the grinding wheel 11 on the spindle 17 is rotated at all times when it is detached from the spindle 2. At the very least, the spindle 17 is accelerated to the RPM of the spindle 2 not later than at the time when the grinding wheel 11 is to be transferred back to the spindle 2. Such transfer is effected by moving the wheelhead 1 to a position in which the axis of the spindle 2 coincides with the axis of the spindle 17, by causing the motor 41 to move the carrier 16 back to the position of FIG. 1 so that the conical external surface of the rotating anchoring portion 36 abuts the conical internal surface 38 of the rotating spindle 2, by disengaging the clamping unit 29, by engaging the clamping unit 31, and by causing the motor 41 to return the carrier 16 to the retracted position.

The aforementioned synchronizing means 27 constitutes but one of the devices which can be used to ensure that the RPM of the tool spindle 2 is properly related to the RPM of the spindle 17 during transfer of the grinding wheel 11 from the spindle 2 to the spindle 17 or from the spindle 17 to the spindle 2. For example, the spindle 17 can be moved into direct torque-receiving contact with and can be coupled to the spindle 2 during the interval of actual transfer of the grinding wheel from the spindle 2 onto the spindle 17 or the other way around. The coupling means between the two spindles then ensures that the RPM of the spindle 17 is properly related to (i.e., that it preferably exactly matches) the RPM of the spindle 2.

The grinding machine of FIG. 1 is equipped with means for repeatedly transferring one and the same grinding wheel 11 between the spindles 2 and 11. FIG. 2 shows a portion of a modified grinding machine which is designed in such a way that the spindle 2 of the wheelhead 1 can receive different grinding wheels, such as the grinding wheels 44A and 44B. This is accomplished in that the machine is equipped with two preferably identical carriers 16A, 16B which are adjacent each other in such a way that the axes of their spindles (not shown) are parallel to each other and to the axis of the spindle 2. The wheelhead 1 can be moved in the directions indicated by the arrow X so as to place its spindle 2 into register with the spindle of the carrier 16A or 16B. For example, the wheelhead 1 is first moved to the position which is shown in FIG. 2 and the grinding wheel 44A is then transferred from its spindle 2 onto the spindle of the carrier 16A in the same way as described in connection with FIG. 1. In the next step, the carrier 16A is retracted so that the wheelhead 1 can be moved into register with the carrier 16B, and the grinding wheel 44B is then transferred onto the spindle 2, again in the same way as described in connection with FIG. 1. The same procedure is repeated as often as necessary, e.g., in connection with the treatment of each of a short or long series of successive workpieces. The spindle of the carrier 16A rotates during transfer of the grinding wheel 44A between its spindle and the spindle 2, and the spindle of the carrier 16B rotates during transfer of the grinding wheel 44B between its spindle and the spindle 2. The spindle 2 is also driven during each transfer of a grinding wheel onto or from the wheelhead 1 so as to shorten the intervals of treatment of successive workpieces, to reduce the energy requirements of the grinding machine, and to reduce wear upon the bearings, belts and other parts of the means for rotatably mounting and driving the spindles.

The grinding machine of FIG. 2 can be equipped with three or more carriers, depending on the number of grinding wheels which are required to complete the treatment of a workpiece. The carriers 16A and 16B of FIG. 2 are shown in retracted positions. When they occupy such retracted positions, the carriers must be sufficiently remote from the path of movement of the wheelhead 1 along its guide means 13a, 13b and 14 to ensure that the spindle 2 and the selected grinding wheel thereon can move toward a properly mounted and clamped workpiece, not shown.

The improved machine tool is susceptible of many additional modifications without departing from the spirit of the invention. For example, if a conventional wheel changer is equipped with means for rotating a spindle corresponding to the spindle 17 of the apparatus of FIG. 1 or the spindle of one of the carriers 16A, 16B shown in FIG. 2, such modified wheel changer constitutes a carrier which can cooperate with the spindle 2 to effect the transfer of grinding wheels to and from the spindle 2 while the spindle 2 rotates.

The invention is presently contemplated for incorporation in external cylindrical and many other types of grinding machines. However, it is equally within the purview of the invention to apply the aforediscussed principle of rotating the tool spindle during transfer of a rotary material removing or other work treating tool in many other types of machine tools, such as polishing and like machines.

An important advantage of the improved method and machine tool is that the treatment of workpieces can be completed within shorter intervals of time because it is not necessary to decelerate and again accelerate the tool spindle 2 preparatory to and upon completion of each tool changing operation. Furthermore, the energy requirements of the machine tool are much lower than those of conventional machine tools with tool changing equipment. Still further, the wear upon the bearings, tool spindle, belts and other parts of the machine tool is much less pronounced than in heretofore known machines. In addition, the machine tool is highly versatile in that it can be designed to repeatedly transfer one and the same rotary material removing tool or to transfer two or more different tools, depending upon the number of tools which are required to treat a workpiece.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of manipulating a material removing wheel which is mounted on the rotary spindle of a machine tool during removal of material from workpieces, comprising the steps of rotating the spindle; moving the spindle relative to a wheel carrier rotating at substantially the speed of the spindle, aligning the spindle axially with the wheel carrier, engaging the wheel with the wheel carrier, and disengaging the wheel from the spindle while the wheel rotates.

2. The method of claim 1, further comprising the step of maintaining the carrier in rotary motion as long as the wheel is supported by the carrier.

3. A method of manipulating a material removing wheel which is mounted on the rotary spindle of a machine tool during removal of material from workpieces, comprising the steps of rotating the spindle, moving the spindle relative to a wheel carrier rotating at substantially the speed of the spindle, aligning the spindle axially with the wheel carrier, engaging the wheel with the spindle, and disengaging the wheel from the wheel carrier while the wheel rotates.

4. The method of claim 3, further comprising the step of maintaining the spindle in rotary motion as long as the wheel is supported by the spindle.

* * * * *